US009888035B2

United States Patent
Venkataramani et al.

(10) Patent No.: US 9,888,035 B2
(45) Date of Patent: Feb. 6, 2018

(54) SYSTEMS AND METHODS FOR DETECTING MAN-IN-THE-MIDDLE ATTACKS

(71) Applicant: Symantec Corporation, Mountain View, CA (US)

(72) Inventors: Srinath Venkataramani, Karnataka (IN); Rosarin Jolly Roy Antonyraj, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 180 days.

(21) Appl. No.: 14/824,775

(22) Filed: Aug. 12, 2015

(65) Prior Publication Data

US 2017/0006060 A1  Jan. 5, 2017

(30) Foreign Application Priority Data

Jun. 30, 2015 (IN) .......................... 2500/MUM/2015

(51) Int. Cl.
*H04L 29/06* (2006.01)
*H04W 12/12* (2009.01)
(Continued)

(52) U.S. Cl.
CPC ...... *H04L 63/1466* (2013.01); *H04L 63/0876* (2013.01); *H04L 67/26* (2013.01);
(Continued)

(58) Field of Classification Search
CPC .. H04L 63/1466; H04L 63/0876; H04W 4/02; H04W 12/12
(Continued)

(56) References Cited

U.S. PATENT DOCUMENTS 8,533,821 B2 * 9/2013 Crume ................ H04L 63/1441
713/165
8,577,813 B2 † 11/2013 Weiss
(Continued)

OTHER PUBLICATIONS

"IPAddressLabs.com", http://www.ipaddresslabs.com, as accessed Jun. 4, 2015, (Feb. 6, 2012).
(Continued)

*Primary Examiner* — Hadi Armouche
*Assistant Examiner* — Angela Holmes
(74) *Attorney, Agent, or Firm* — FisherBroyles, LLP

(57) ABSTRACT

A computer-implemented method for detecting man-in-the-middle attacks may include (1) registering a mobile device of a user within a computing environment as an authenticated mobile device that corresponds to the user, (2) receiving an authentication request to log into a secure computing resource as the user, (3) transmitting, in response to receiving the authentication request, an out-of-band push authentication prompt to the registered mobile device of the user through a different channel than a channel through which the authentication request was received, (4) comparing a geolocation indicated by the authentication request with a geolocation indicated by the registered mobile device, and (5) performing remedial action in response to detecting a man-in-the-middle attack based on a determination that the geolocation indicated by the authentication request and the geolocation indicated by the registered mobile device do not match. Various other methods, systems, and computer-readable media are also disclosed.

20 Claims, 7 Drawing Sheets

(51) Int. Cl.
*H04W 4/02* (2009.01)
*H04L 29/08* (2006.01)
*H04W 12/06* (2009.01)

(52) U.S. Cl.
CPC ............ *H04W 4/02* (2013.01); *H04W 12/12* (2013.01); *H04L 63/18* (2013.01); *H04W 12/06* (2013.01)

(58) Field of Classification Search
USPC .......................................................... 726/7
See application file for complete search history.

(56) References Cited

U.S. PATENT DOCUMENTS

| | | | |
|---|---|---|---|
| 8,613,052 B2 † | 12/2013 | Weiss | |
| 8,856,539 B2 † | 10/2014 | Weiss | |
| 9,100,826 B2 † | 8/2015 | Weiss | |
| 9,530,137 B2 † | 12/2016 | Weiss | |
| 9,531,696 B2 † | 12/2016 | Weiss | |
| 2008/0103790 A1* | 5/2008 | Abernethy | G06Q 30/018 705/317 |
| 2011/0219230 A1* | 9/2011 | Oberheide | H04L 9/32 713/168 |
| 2012/0331527 A1* | 12/2012 | Walters | G06F 21/6218 726/4 |
| 2013/0166918 A1* | 6/2013 | Shahbazi | H04L 9/0863 713/183 |

OTHER PUBLICATIONS

"Symantec™ VIP Intelligent Authentication", https://www.symantec.com/content/en/us/enterprise/fact_sheets/b-vip_intelligent_authentication_DS_21213685.en-us.pdf, as accessed Jun. 4, 2015, Symantec Corporation, (Oct. 2011).

"Two-factor authentication", https://en.wikipedia.org/wiki/Two-factor_authentication, as accessed Jun. 4, 2015, Wikipedia, (Nov. 4, 2005).

"Cell ID", https://en.wikipedia.org/wiki/Cell_ID, as accessed Jun. 4, 2015, Wikipedia, (Mar. 27, 2010).

"Symantec™ VIP Intelligent Authentication", http://www.brendonwilson.com/wp-content/uploads/resume/samples/Symantec%20VIP%20Intelligent%20Authentication%20Technical%20Whitepaper.pdf, as accessed Jun. 4, 2015, Technical White Paper, Symantec Corporation, (Mar. 2012).

* cited by examiner
† cited by third party

US 9,888,035 B2

SYSTEMS AND METHODS FOR DETECTING MAN-IN-THE-MIDDLE ATTACKS

BACKGROUND

Individuals and organizations typically seek to protect their computing resources and computer networks from attacks by authenticating users during login sequences. For example, enterprise organizations may instruct employees to perform first factor authentication (e.g., password confirmation) upon attempts to log into enterprise computers. More sophisticated systems may use two-factor authentication, which bases authentication of the user on a combination of two different things. These two different things may be selected from something that the user knows, something that the user possesses, and something that is inseparable from the user.

Despite the use of traditional authentication procedures to protect computing resources, attackers are still succeeding in attacking and/or compromising some of these procedures. For example, attackers may perform a man-in-the-middle attack in which the attackers situate themselves between the user and the secure computing resources. The attackers then spoof the identity of the user by modifying network traffic between the user and the secure computing resources. In some examples, attackers have succeeded in performing man-in-the-middle attacks that overcome two-factor authentication procedures. Accordingly, the instant disclosure identifies and addresses a need for additional and improved systems and methods for detecting man-in-the-middle attacks.

SUMMARY

As will be described in greater detail below, the instant disclosure generally relates to systems and methods for detecting man-in-the-middle attacks by, for example, comparing the geolocation indicated by an authentication request and the geolocation indicated by a mobile device and checking whether they satisfy a proximity threshold, as discussed further below. In one example, a computer-implemented method for detecting man-in-the-middle attacks may include (1) registering a mobile device of a user within a computing environment as an authenticated mobile device that corresponds to the user, (2) receiving an authentication request to log into a secure computing resource as the user, (3) transmitting, in response to receiving the authentication request, an out-of-band push authentication prompt to the registered mobile device of the user through a different channel than a channel through which the authentication request was received, (4) comparing a geolocation indicated by the authentication request with a geolocation indicated by the registered mobile device in response to the out-of-band push authentication prompt, and (5) performing remedial action in response to detecting a man-in-the-middle attack based on a determination that the geolocation indicated by the authentication request and the geolocation indicated by the registered mobile device do not match.

In some examples, registering the mobile device may include installing a mobile security application on the mobile device and signing a message from the mobile device to a registration server using a private key embedded within the mobile security application. In one embodiment, transmitting, in response to receiving the authentication request, the out-of-band push authentication prompt to the registered mobile device may include transmitting a request for the user to approve of the authentication request.

In one embodiment, transmitting, in response to receiving the authentication request, the out-of-band push authentication prompt to the registered mobile device may include transmitting a verification code for the user to enter through the channel through which the authentication request was received. In another embodiment, the geolocation indicated by the authentication request is ascertained through a service that provides access to a database that maps Internet protocol addresses to geolocation information.

In one embodiment, the service provides a record that specifies (1) an address, (2) longitude and latitude coordinates, and/or (3) an organization. In one embodiment, the geolocation indicated by the registered mobile device is ascertained through accessing an application programming interface of the registered mobile device that provides the geolocation through a global positioning system and/or accessing a cell id associated with the registered mobile device.

In some examples, detecting the man-in-the-middle attack may include identifying information indicating a potential false positive in detecting the man-in-the-middle attack and determining that the man-in-the-middle attack is detected despite the indication of the potential false positive.

In some examples, determining that the man-in-the-middle attack is detected despite the indication of the potential false positive may include identifying a lack of confirmation information that would confirm the potential false positive. The confirmation information may include (1) satisfaction of a challenge prompt at the registered mobile device in response to identifying the information indicating a potential false positive, (2) user history information confirming that the user is trusted, (3) information about other users that share attributes with the user, (4) information indicating that an Internet protocol address does not hop, and/or (5) information confirming that the user requests to access the secure computing resource through at least one of a proxy and a network address translation mechanism.

In some examples, detecting the man-in-the-middle attack may include receiving an indication that the authentication request is transmitted from the registered mobile device. Moreover, detecting the man-in-the-middle attack may also include detecting that an Internet protocol address of the authentication request and an Internet protocol address indicated by the registered mobile device are not an exact match.

In one embodiment, a system for implementing the above-described method may include (1) a registration module, stored in memory, that registers a mobile device of a user within a computing environment as an authenticated mobile device that corresponds to the user, (2) a reception module, stored in memory, that receives an authentication request to log into a secure computing resource as the user, (3) a transmission module, stored in memory, that transmits, in response to receiving the authentication request, an out-of-band push authentication prompt to the registered mobile device of the user through a different channel than a channel through which the authentication request was received, (4) a comparison module, stored in memory, that compares a geolocation indicated by the authentication request with a geolocation indicated by the registered mobile device in response to the out-of-band push authentication prompt, (5) a performance module, stored in memory, that performs remedial action in response to detecting a man-in-the-middle attack based on a determination that the geolocation indicated by the authentication request and the geolocation indicated by the registered mobile device do not match, and (6) at least one physical processor configured to execute the registration module, the reception module, the transmission module, the comparison module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) register a mobile device of a user within a computing environment as an authenticated mobile device that corresponds to the user, (2) receive an authentication request to log into a secure computing resource as the user, (3) transmit, in response to receiving the authentication request, an out-of-band push authentication prompt to the registered mobile device of the user through a different channel than a channel through which the authentication request was received, (4) compare a geolocation indicated by the authentication request with a geolocation indicated by the registered mobile device in response to the out-of-band push authentication prompt, and (5) perform remedial action in response to detecting a man-in-the-middle attack based on a determination that the geolocation indicated by the authentication request and the geolocation indicated by the registered mobile device do not match.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
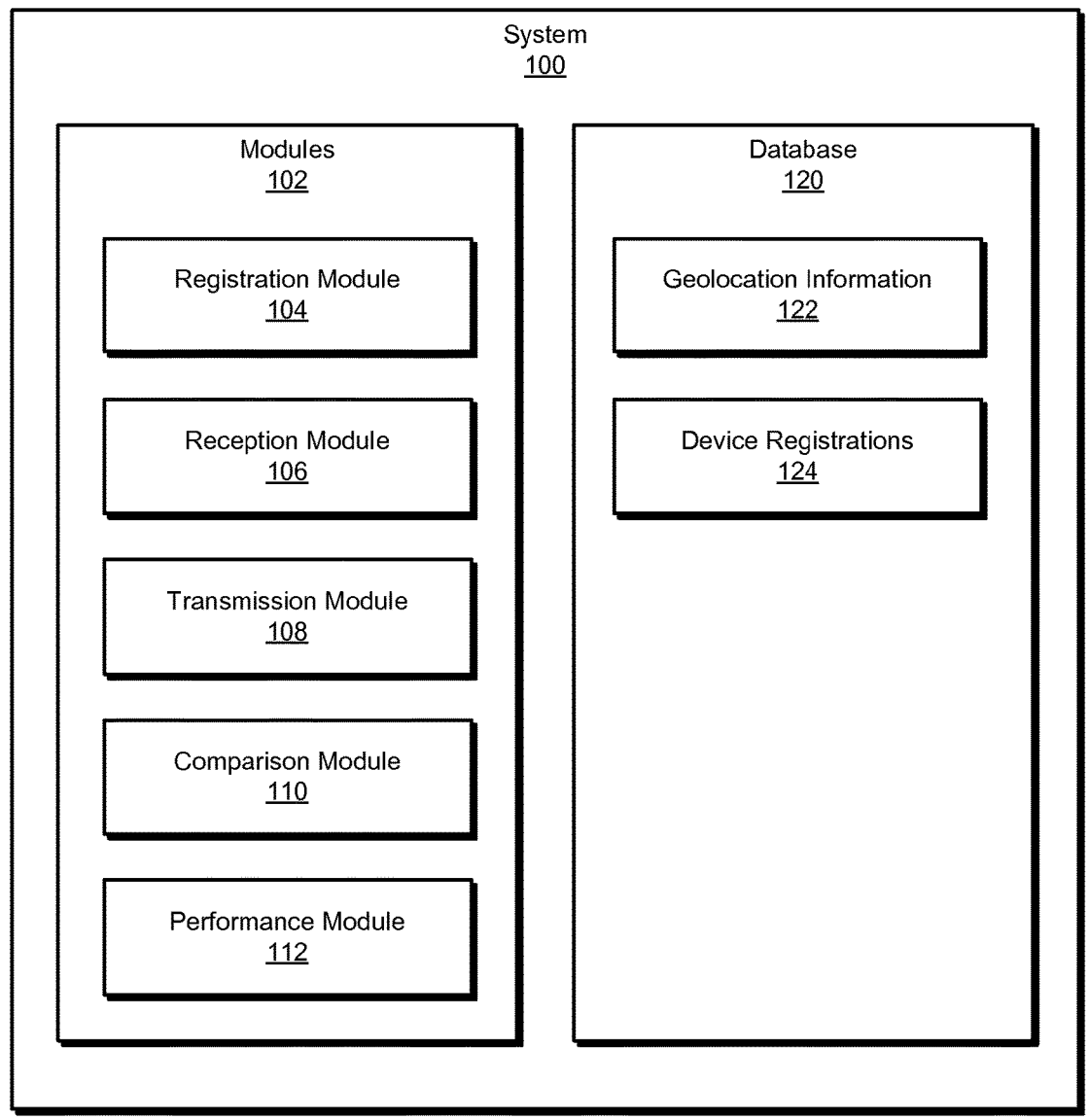
FIG. 1 is a block diagram of an exemplary system for detecting man-in-the-middle attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting man-in-the-middle attacks. As will be explained in greater detail below, the systems and methods described herein may enable enterprises and other organizations to protect computing resources from sophisticated man-in-the-middle attacks that would otherwise overcome certain forms of two-factor authentication, as discussed further below. The systems and methods described herein may also enable network administrators and/or their computing resources to take remedial action to protect users in response to detecting man-in-the-middle attacks.

Figure 2:
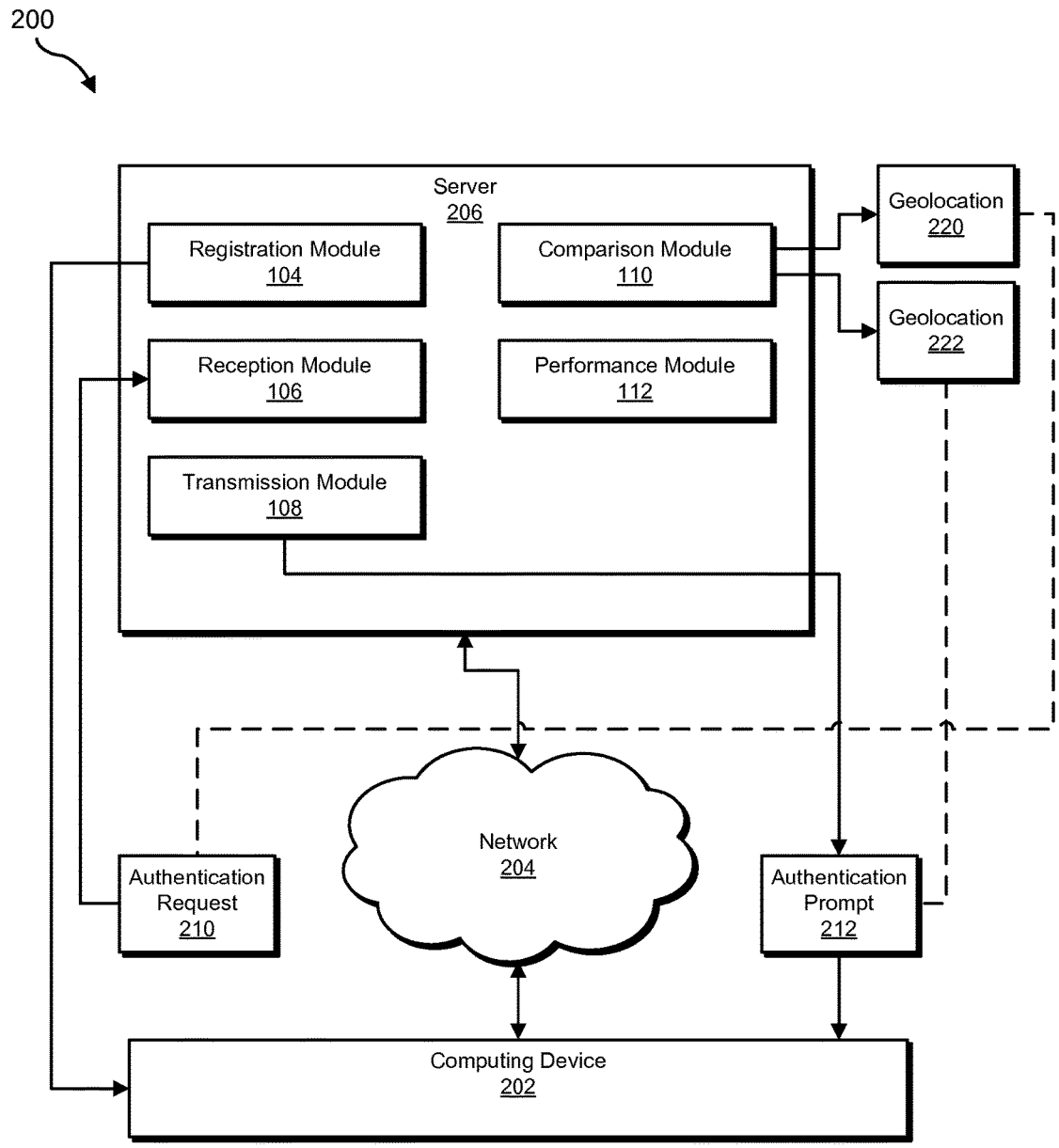
FIG. 2 is a block diagram of an additional exemplary system for detecting man-in-the-middle attacks.

The following will provide, with reference to FIGS. 1-2, detailed descriptions of exemplary systems for detecting man-in-the-middle attacks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting man-in-the-middle attacks. As illustrated in this figure, exemplary system 100 may include one or more modules 102 for performing one or more tasks. For example, and as will be explained in greater detail below, exemplary system 100 may also include a registration module 104 that may register a mobile device of a user within a computing environment as an authenticated mobile device that corresponds to the user. Exemplary system 100 may additionally include a reception module 106 that may receive an authentication request to log into a secure computing resource as the user. Exemplary system 100 may also include a transmission module 108 that may transmit, in response to receiving the authentication request, an out-of-band push authentication prompt to the registered mobile device of the user through a different channel than a channel through which the authentication request was received. Exemplary system 100 may additionally include a comparison module 110 that may compare a geolocation indicated by the authentication request with a geolocation indicated by the registered mobile device in response to the out-of-band push authentication prompt. Exemplary system 100 may also include a performance module 112 that may perform remedial action in response to detecting a man-in-the-middle attack based on a determination that the geolocation indicated by the authentication request and the geolocation indicated by the registered mobile device do not match. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store geolocation information 122, which may indicate the geolocation of an authentication request and/or a registered mobile device, as discussed further below. Database 120 may also include device registrations 124, which may specify or identify mobile devices registered with system 100. The systems and methods described herein may protect users from man-in-the-middle attacks at least in part by trusting that an out-of-band channel associated with the registered mobile device is secure. The systems and methods described herein may then compare the geolocation of the registered mobile device with the geolocation of an authentication request, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect man-in-the-middle attacks (e.g., where the attacker has obtained the fingerprint of the computing device used for authentication requests and spoofs the registered user). For example, and as will be described in greater detail below, registration module 104 may register a mobile device (e.g., computing device 202) of a user within a computing environment as an authenticated mobile device that corresponds to the user. Reception module 106 may receive an authentication request 210 to log into a secure computing resource as the user. Transmission module 108 may transmit, in response to receiving authentication request 210, an out-of-band push authentication prompt 212 to the registered mobile device of the user through a different channel than a channel through which authentication request 210 was received. Comparison module 110 may compare a geolocation 220 indicated by authentication request 210 with a geolocation 222 indicated by the registered mobile device in response to out-of-band push authentication prompt 212. Performance module 112 may perform remedial action in response to detecting a man-in-the-middle attack based on a determination that geolocation 220 indicated by authentication request 210 and geolocation 222 indicated by the registered mobile device do not match.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of facilitating the detection of man-in-the-middle attacks according to method 300 described further below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
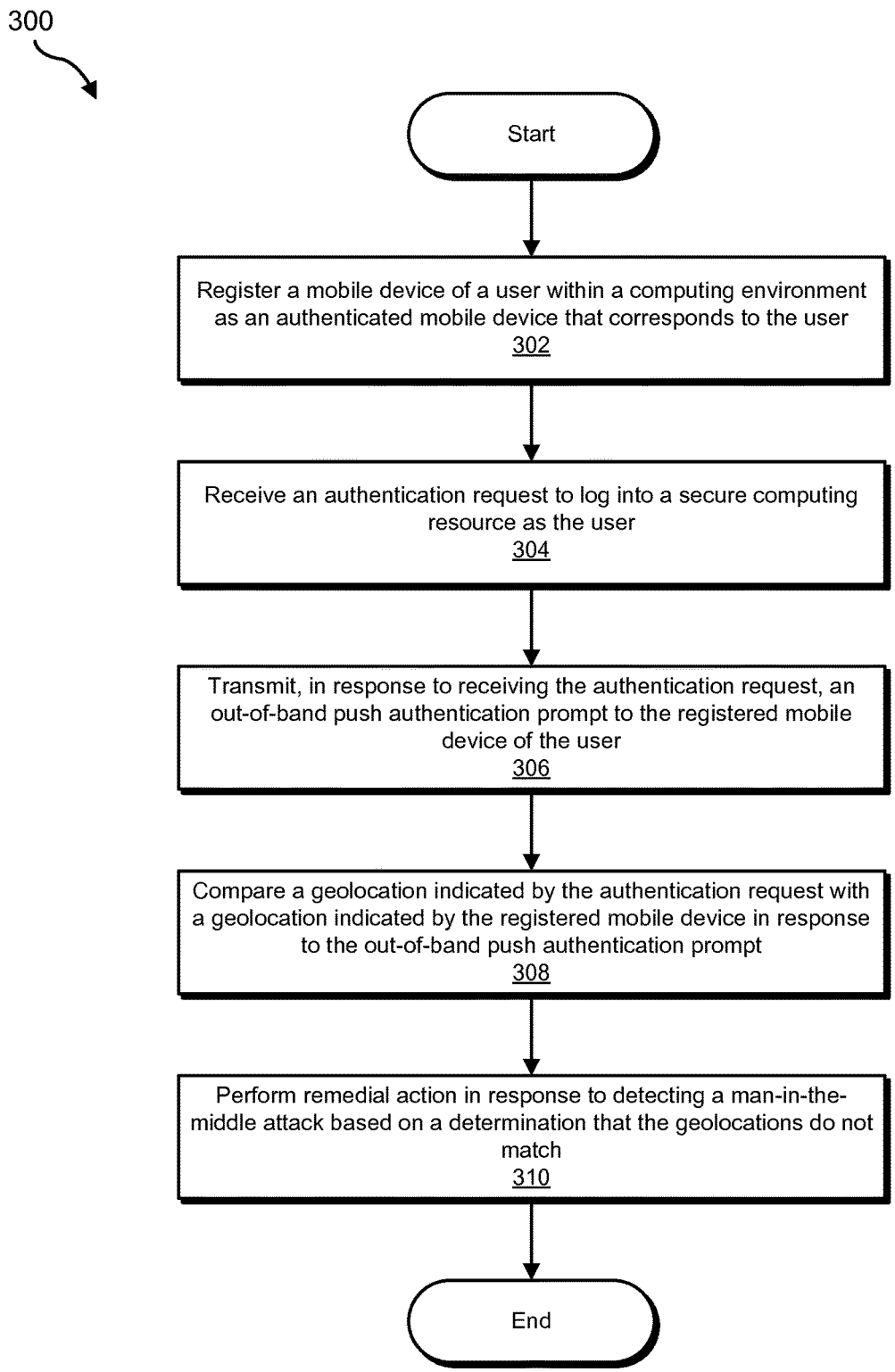
FIG. 3 is a flow diagram of an exemplary method for detecting man-in-the-middle attacks.

FIG. 3 is a flow diagram of an exemplary computer-implemented method 300 for detecting man-in-the-middle attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may register a mobile device of a user within a computing environment as an authenticated mobile device that corresponds to the user. For example, registration module 104 may, as part of server 206 in FIG. 2, register a mobile device of a user (e.g., computing device 202) within a computing environment as an authenticated mobile device that corresponds to the user.

As used herein, the phrase "register" generally refers to the process of authenticating a mobile device as belonging to a protected user and recording the authentication for future reference when the user attempts to access secure computing resources using the mobile device. Similarly, the phrase "mobile device that corresponds to the user" generally refers to tying or linking the mobile device to the user in the registration process such that system 100 may authorize the user to access computing resources through the specified mobile device.

Registration module 104 may register the mobile device in a variety of ways. In some examples, registration module 104 may install a mobile security application on the mobile device. Moreover, registration module 104 may also sign a message from the mobile device to a registration server using a private key embedded within the mobile security application. The user and the mobile device may thereby authenticate themselves in the registration process using a public key infrastructure such as SSL and/or TLS. During the registration process the user may also provide information to a backend security server, such as server 206, that the enterprise or proprietor of the secure computing resource personally provided to the user.

At step 304, one or more of the systems described herein may receive an authentication request to log into a secure computing resource as the user. For example, reception module 106 may, as part of server 206 in FIG. 2, receive authentication request 210 to log into a secure computing resource as the user.

As used herein, the term "authentication request" generally refers to any network message from the user that requests for the system to authenticate the user to thereby enable the user to access the secure computing resource. Moreover, as used herein, the term "secure computing resource" generally refers to any computing resource that a security system may protect from unauthorized access, such as by initiating authentication procedures upon requests to access the resource. Examples of secure computing resources may include physical hardware, software, network nodes, and/or protected, private and/or proprietary data.

Reception module 106 may receive the authentication request in a variety of ways. In general, reception module 106 may receive a network message indicating that the author of the message alleges to be the user and requests to access the secure computing resource. Reception module 106 may receive the network message through the web, the Internet, and/or another network, such as network 204.

At step 306, one or more of the systems described herein may transmit, in response to receiving the authentication request, an out-of-band push authentication prompt to the registered mobile device of the user through a different channel than a channel through which the authentication request was received. For example, transmission module 108 may, as part of server 206 in FIG. 2, transmit, in response to receiving authentication request 210, out-of-band push authentication prompt 212 to the registered mobile device of the user through a different channel than a channel through which authentication request 210 was received.

As used herein, the term "out-of-band push authentication prompt" generally refers to a prompt initiated by a server toward a client that requests for the user to approve the authentication request. Specifically, the authentication prompt corresponds to a "push authentication prompt" in the sense that the server initiates the prompt upon receiving the authentication request rather than transmitting the prompt in response to communication from the registered mobile device. Furthermore, the authentication prompt is out-of-band in the sense that the authentication prompt is transmitted through a different channel (e.g., in terms of encryption protocols, network protocols, network path, and/or differing endpoints) than the channel through which the authentication request is received. As used herein, the term "channel" generally refers to a network path and/or configuration, as discussed above. The systems described herein may use two different channels for the authentication procedure to thereby increase redundancy and decrease the probability of an attacker successfully compromising the secure computing resource (e.g., because it is more difficult to compromise two different channels than just compromising one channel). In some examples, the server may transmit the entirety of the content of the prompt. In other examples, the server may simply transmit the prompt in the form of a bit or code message triggering the mobile device to display appropriate content to the user.

Figure 4:
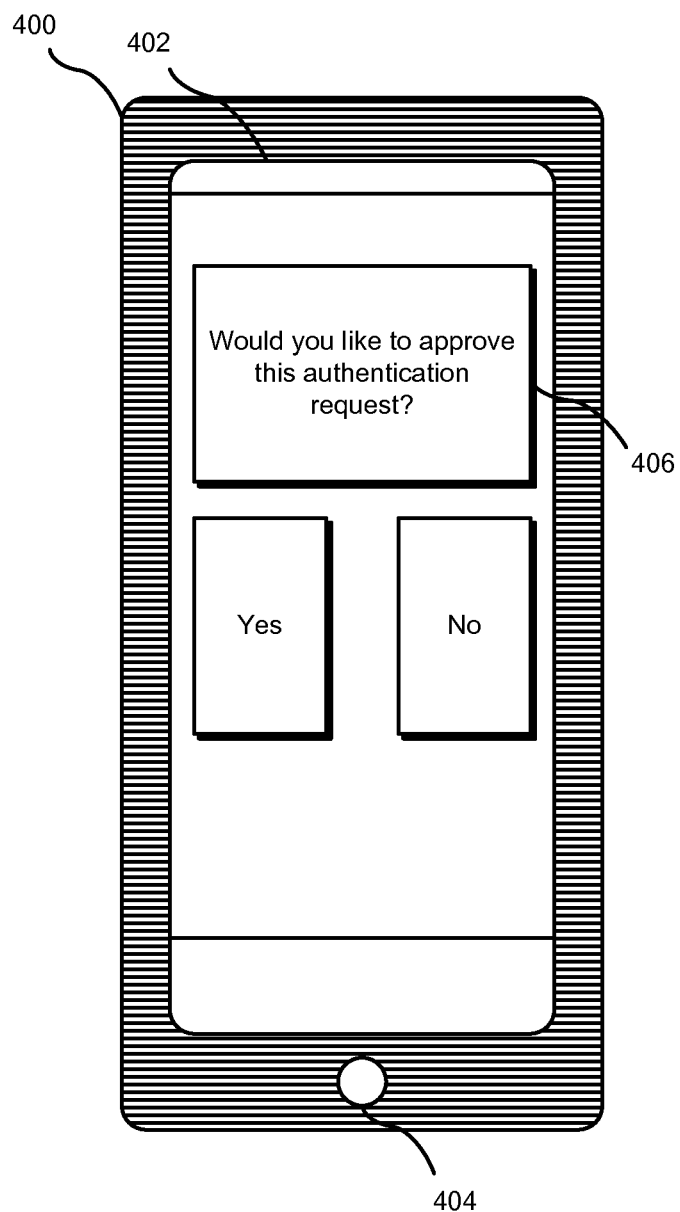
FIG. 4 is a block diagram of an exemplary mobile device.

Transmission module 108 may transmit authentication prompt 212 in a variety of ways. In some examples, transmission module 108 may transmit, in response to receiving the authentication request, the out-of-band push authentication prompt to the registered mobile device by transmitting a request for the user to approve of the authentication request. FIG. 4 illustrates a mobile device 400, such as a smart phone, which includes a button 404 and a display screen 402. Within display screen 402, mobile device 400 may display a notification 406, which may correspond to authentication prompt 212. As further shown in FIG. 4 the user at mobile device 400 may respond to notification 406 by selecting either "yes" or "no" such as by selecting the appropriate button on display screen 402 as a touchscreen. Notably, in some examples, transmission module 108 may only transmit the authentication prompt in response to determining that authentication request 210 originates from an unknown computing device or otherwise results in detecting an anomaly.

In the example of FIG. 4, notification 406 simply requests for the user to indicate whether the user approves of the authentication request, such as by selecting either "yes" or "no," as discussed above. Alternatively, transmission module 108 may transmit, in response to receiving the authentication request, the out-of-band push authentication prompt to the registered mobile device by transmitting a verification code for the user to enter through the channel through which the authentication request was received. In other words, notification 406 may specify a message or code (e.g., "3243") for the user to enter through the other channel to verify that the user at the other channel also has access to the registered mobile device and its trusted channel.

Figure 5:
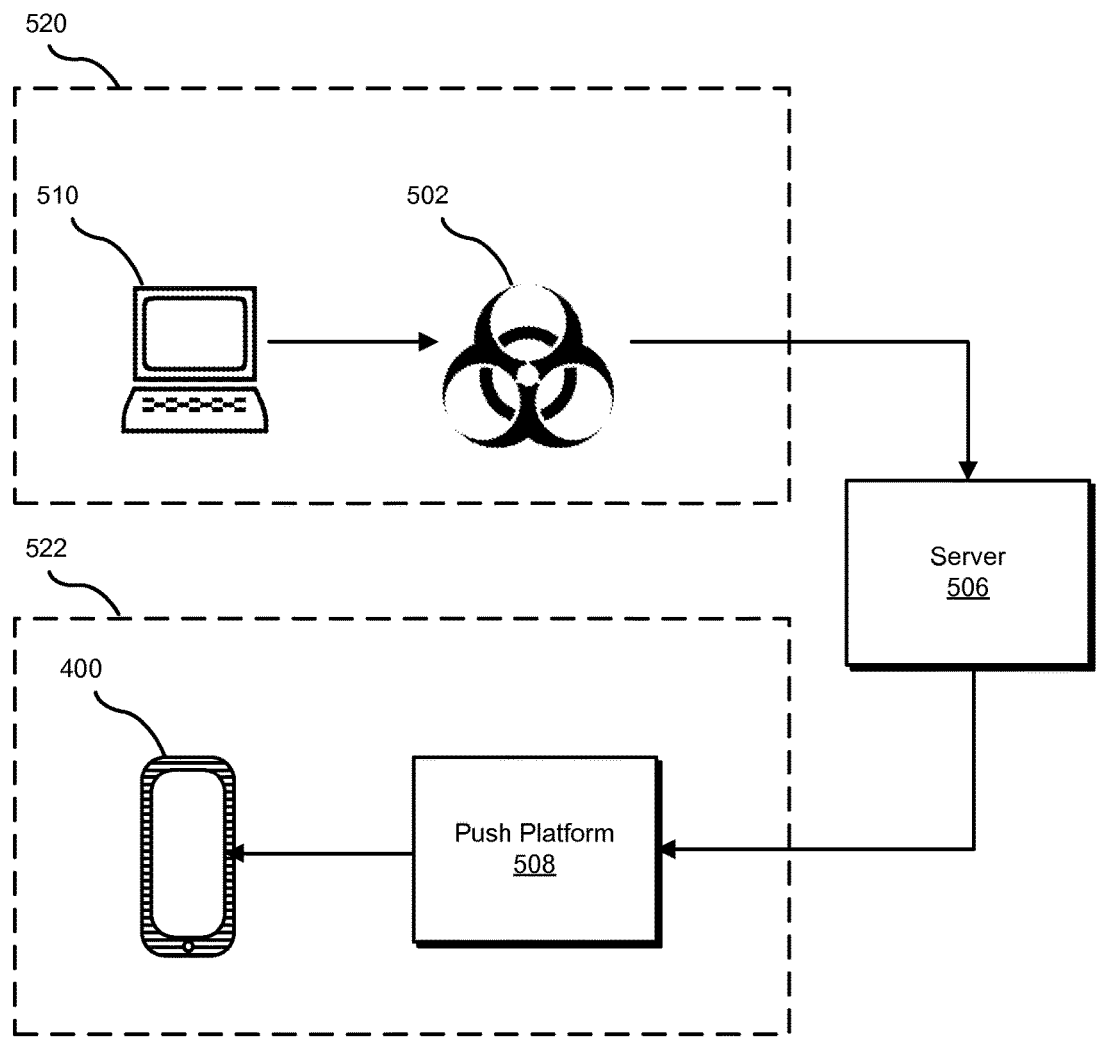
FIG. 5 is a block diagram of an exemplary workflow illustrating systems for detecting man-in-the-middle attacks.

FIG. 5 further illustrates a workflow involving the systems and methods described herein. As shown in FIG. 5, a channel 520 may not necessarily be trusted, because the endpoint has not completed a registration process, in contrast to the registered mobile device, as discussed above. Rather, channel 520 may correspond to any client device on the network, such as the Internet, attempting to access the secure computing resource. As further shown in FIG. 5, channel 520 may include a man-in-the-middle attack site 502, which may be interposed between server 206 and a computing device 510 that transmits the authentication request.

In contrast, FIG. 5 also illustrates a channel 522 (e.g., trusted channel) that includes mobile device 400 as well as a push platform 508. Push platform 508 may push authentication prompt 212 to mobile device 400, as further discussed above. By receiving approval of the authentication request from mobile device 400 in response to push platform 508 pushing authentication prompt 212, server 206 may thereby authenticate the user and allow access to the secure computing resource. Nevertheless, if server 206 detects a mismatch between the geolocation for computing device 510 and/or site 502, on the one hand, and mobile device 400, on the other hand, then server 206 (or computing device 510 and/or mobile device 400) may take remedial action, as discussed further below.

At step 308, one or more of the systems described herein may compare a geolocation indicated by the authentication request with a geolocation indicated by the registered mobile device in response to the out-of-band push authentication prompt. For example, comparison module 110 may, as part of server 206 in FIG. 2, compare a geolocation indicated by authentication request 210 with a geolocation indicated by the registered mobile device in response to out-of-band push authentication prompt 212.

As used herein, the term "geolocation" generally refers to any data specifying or describing a physical location in the world. Examples of geolocations include addresses, street names, street numbers, city names, town names, county names, country names, longitude and/or latitude coordinates, elevation levels, and/or any other appropriate or suitable items of information that indicate or tend to indicate the physical location of an object within the world. Moreover, the phrase "in response to the out-of-band push authentication prompt" in step 308 generally refers to the mobile device indicating, transmitting, and/or providing the geolocation (e.g., using GPS or cell id) in response to receiving the out-of-band push authentication prompt." In other examples, the mobile device may simply provide the geolocation at a time subsequent to receiving the authentication prompt without submitting the geolocation in response to the authentication prompt. Moreover, in some examples, the mobile security application may obtain the geolocation in response to receiving the authentication prompt, such as by accessing an application programming interface of the mobile device that provides access to global positioning system and/or cell ID information.

Comparison module 110 may compare the geolocations in a variety of ways. In general, comparison module 110 may use any suitable proximity metric or method for measuring proximity between different items or types of geolocation information to perform the comparison. In some examples, the two geolocations may have different initial formats. Accordingly, comparison module 110 may map one or both of the two geolocations to a common format. Comparison module 110 may then measure or categorize the distance between the two geolocations according to the common format.

In one embodiment, the geolocation indicated by the authentication request is ascertained through a service that provides access to a database that maps Internet protocol addresses to geolocation information. For example, a web-enabled service may automatically transmit geolocation information in response to requests for submissions that specify Internet protocol addresses. For example, the service may provide a record that specifies at least one of: (1) an address, (2) longitude and latitude coordinates, and/or (3) an organization. More specifically, a service such as IP GEO-LOC IP ADDRESS GEOLOCATION ONLINE SERVICE may provide records that specify, for requested Internet protocol addresses, the corresponding continent, country code, country name, region (state, county, province, region, territory, district, etc.), city, postal/zip code, metro code, area code, latitude, longitude, Internet service provider (ISP) and/or organization. Notably, the geolocation indicated by the mobile device may be ascertained in the same manner using Internet protocol addresses, as discussed above.

In further examples, the geolocation indicated by the registered mobile device may be ascertained through (1) accessing an application programming interface of the registered mobile device that provides the geolocation through a global positioning system and/or (2) accessing a cell id associated with the registered mobile device. The cell id may indicate a generally unique number used to identify a cell tower location and/or a base transceiver station (BTS) or sector of a BTS within a location area code if not within a GSM network. The registered mobile device may provide the geolocation in response to the authentication prompt 212 (in alternative embodiments, the registered mobile device may provide the geolocation information at other times, such as scheduled times, according to a fixed interval, and/or preemptively). Moreover, the registered mobile device may provide the geolocation in a manner that is transparent to the user at mobile device 400, the user at computing device 510, and/or the attacker at site 502.

At step 310, one or more of the systems described herein may perform remedial action in response to detecting a man-in-the-middle attack based on a determination that the geolocation indicated by the authentication request and the geolocation indicated by the registered mobile device do not match. For example, performance module 112 may, as part of server 206 in FIG. 2, perform remedial action in response to detecting a man-in-the-middle attack based on a determination that the geolocation indicated by authentication request 210 and the geolocation indicated by the registered mobile device do not match.

As used herein, the term "remedial action" generally refers to any action that an administrator, user, and/or computing resource may take to protect a user from a detected man-in-the-middle attack. Examples of remedial actions include blocking or denying the authentication request, blocking or denying access to the secure computing resource, flagging the geolocation or Internet protocol address of the authentication request, notifying authorities, taking retaliatory action, increasing a level of security measures, and/or notifying administrators or users. Moreover, the phrase "do not match" generally refers to a negative result of the comparison performed at step 308, as discussed above. In other words, comparison module 110 may compare the two geolocations using any suitable proximity metric to obtain a measure of proximity and then compare the measure of proximity with a proximity threshold that distinguishes between matching and nonmatching geolocations.

In some examples, performance module 112 may detect the man-in-the-middle attack at least in part by identifying information indicating a potential false positive (i.e., a false indication of attack or false alarm). For example, performance module 112 may detect that a large number of authentication requests (e.g., beyond a threshold) originate from a single Internet protocol address or geolocation or a small set of such locations (e.g., below a threshold). This situation is consistent with both (1) a man-in-the-middle attack (because the attacker may be intercepting authentication requests from a large number of different users and/or intercepting authentication requests from the same user at different devices or locations) and (2) one or more users accessing the network through a proxy and/or network address translation mechanism, which may translate a number of different original addresses to a single address or smaller set of addresses. Accordingly, performance module 112 may check for further information that may distinguish between these two situations.

For example, performance module 112 may check for one or more of the following items of information: (1) satisfaction of a challenge prompt at the registered mobile device in response to identifying the information indicating a potential false positive, (2) user history information confirming that the user and/or Internet protocol address or geolocation is trusted, (3) information about other users that share attributes with the user (i.e., similar users, such as users in proximity to each other, are likely to be similarly trusted or distrusted), (4) information indicating that an Internet protocol address does not hop (the hop may indicate that the attacker is using an incognito technique such as TOR), and/or (5) information confirming that the user requests to access the secure computing resource through at least one of a proxy and a network address translation mechanism. In general, performance module 112 may increase or decrease a security score and/or man-in-the-middle estimation score based on one or more of these factors according to any weighted or unweighted average, function, and/or business logic. Moreover, in some examples, performance module 112 may only consult one or more of these items of information upon detecting earlier information indicating a potential false positive, as discussed above (e.g., detecting a large number of requests from a smaller number of locations may trigger a process for distinguishing false positives from true positives).

In other examples, performance module 112 may receive an indication that the authentication request is transmitted from the registered mobile device. For example, performance module 112 may extract the indication from metadata embedded within the authentication request. Additionally or alternatively, the authentication request may specify an identity or fingerprint of the computing device (e.g., computing device 510) that transmits the authentication request. Accordingly, performance module 112 may determine that the computing device transmitting the authentication request and the registered mobile device are the same device. In that case, because the authentication request alleges that these two devices are the same, performance module 112 may check or verify that they have the exact same Internet protocol address. In general, in this case, performance module 112 may heighten or elevate the degree of geolocation proximity used to disconfirm the man-in-the-middle attack.

Moreover, in some embodiments, comparison module 110 and/or performance module 112 may be located at mobile device 400 rather than server 206. In these examples, server 206 may forward the geolocation information of the authentication request to mobile device 400, which may then perform the comparison. Similarly, in response to detecting a man-in-the-middle attack, mobile device 400 may take remedial action, as discussed further above.

As explained above in connection with method 300 in FIG. 3, the systems and methods described herein may enable enterprises and other organizations to protect computing resources from sophisticated man-in-the-middle attacks that would otherwise overcome certain forms of two-factor authentication, as discussed further above. The systems and methods described herein may also enable network administrators and/or their computing resources to take remedial action to protect users in response to detecting man-in-the-middle attacks.

Figure 6:
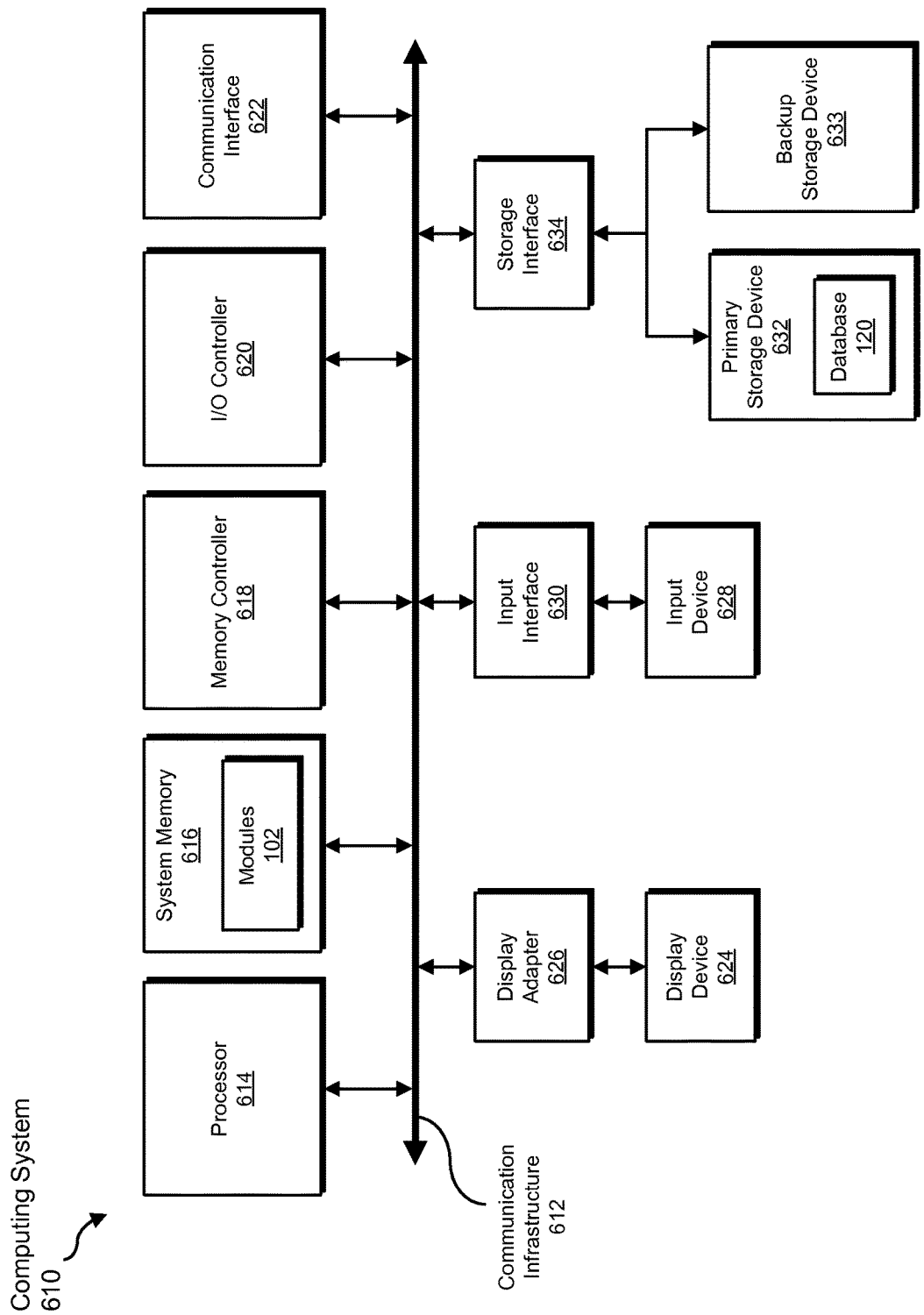
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
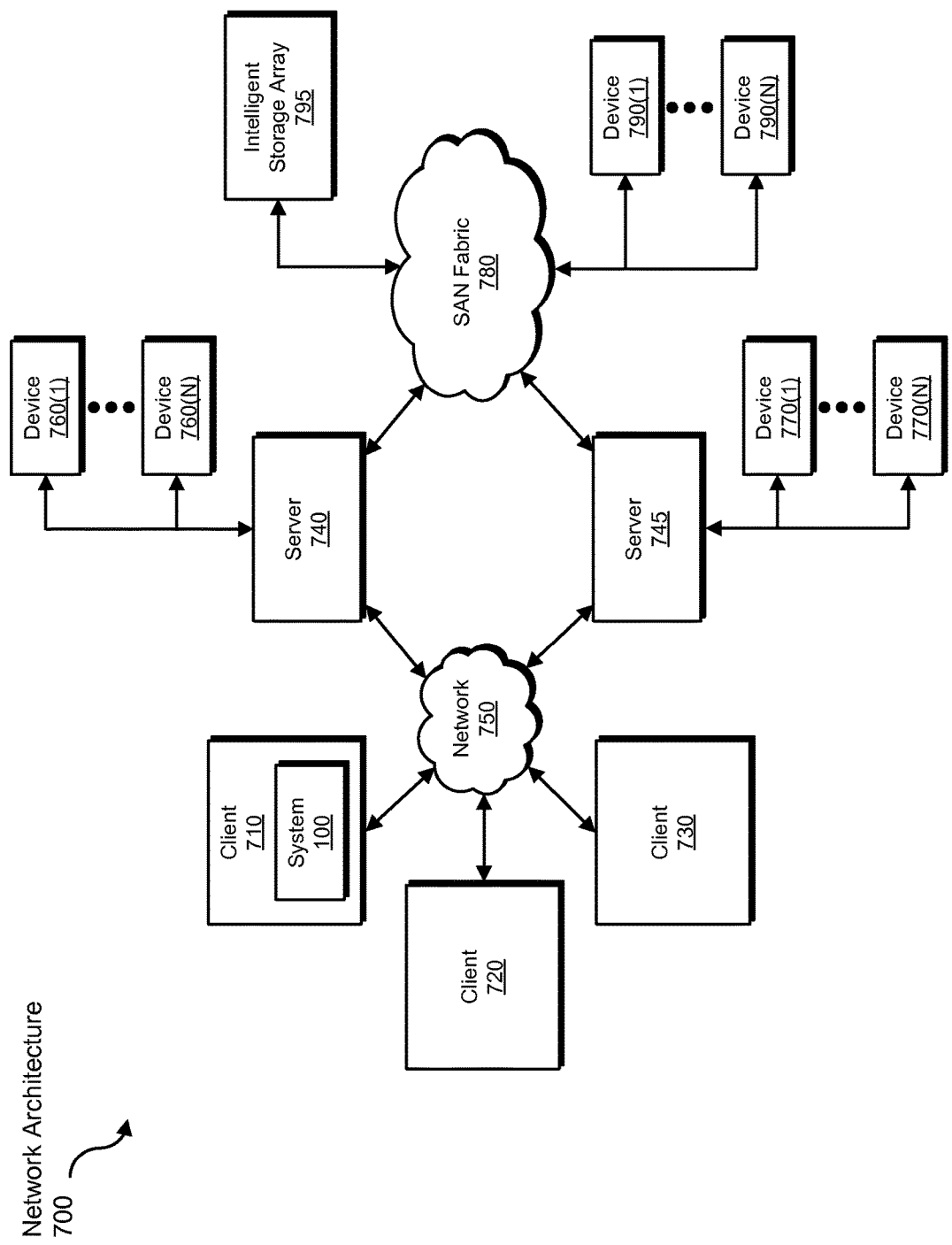
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting man-in-the-middle attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an authentication request and/or associated authentication status to be transformed, transform one or more of these, output a result of the transformation to a display or output device, use the result of the transformation to protect users from man-in-the-middle attacks, and/or store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting man-in-the-middle attacks, at least a portion of the method being performed by a computing device comprising at least one processor, the method comprising:
   registering a mobile device of a user within a computing environment as an authenticated mobile device that corresponds to the user;
   receiving an authentication request to log into a secure computing resource as the user;
   transmitting, in response to receiving the authentication request, an out-of-band push authentication prompt to the registered mobile device of the user through a different channel than a channel through which the authentication request was received;
   comparing a geolocation indicated by the authentication request with a geolocation indicated by the registered mobile device in response to the out-of-band push authentication prompt by comparing a measure of proximity with a proximity threshold that distinguishes between matching and nonmatching geolocations; and
   performing a remedial action in response to detecting a man-in-the-middle attack based on a determination that the geolocation indicated by the authentication request and the geolocation indicated by the registered mobile device do not match.

2. The method of claim 1, wherein registering the mobile device comprises:
   installing a mobile security application on the mobile device;
   signing a message from the mobile device to a registration server using a private key embedded within the mobile security application.

3. The method of claim 1, wherein transmitting, in response to receiving the authentication request, the out-of-band push authentication prompt to the registered mobile device comprises transmitting a request for the user to approve of the authentication request.

4. The method of claim 1, wherein transmitting, in response to receiving the authentication request, the out-of-band push authentication prompt to the registered mobile device comprises transmitting a verification code for the user to enter through the channel through which the authentication request was received.

5. The method of claim 1, wherein the geolocation indicated by the authentication request is ascertained through a service that provides access to a database that maps Internet protocol addresses to geolocation information.

6. The method of claim 5, wherein the service provides a record that specifies at least one of:
   an address;
   longitude and latitude coordinates; and
   an organization.

7. The method of claim 1, wherein the geolocation indicated by the registered mobile device is ascertained through at least one of:
   accessing an application programming interface of the registered mobile device that provides the geolocation through a global positioning system; and
   accessing a cell id associated with the registered mobile device.

8. The method of claim 1, wherein detecting the man-in-the-middle attack comprises:
   identifying information indicating a potential false positive in detecting the man-in-the-middle attack; and
   determining that the man-in-the-middle attack is detected despite the indication of the potential false positive.

9. The method of claim 8, wherein determining that the man-in-the-middle attack is detected despite the indication of the potential false positive comprises identifying a lack of confirmation information that would confirm the potential false positive, the confirmation information comprising at least one of:
   satisfaction of a challenge prompt at the registered mobile device in response to identifying the information indicating a potential false positive;
   user history information confirming that the user is trusted;
   information about other users that share attributes with the user; and
   information indicating that an Internet protocol address does not hop;
   information confirming that the user requests to access the secure computing resource through at least one of a proxy and a network address translation mechanism.

10. The method of claim 1, wherein detecting the man-in-the-middle attack comprises:
    receiving an indication that the authentication request is transmitted from the registered mobile device; and
    detecting that an Internet protocol address of the authentication request and an Internet protocol address indicated by the registered mobile device are not an exact match.

11. A system for detecting man-in-the-middle attacks, the system comprising:
    a registration module, stored in memory, that registers a mobile device of a user within a computing environment as an authenticated mobile device that corresponds to the user;
    a reception module, stored in memory, that receives an authentication request to log into a secure computing resource as the user;
    a transmission module, stored in memory, that transmits, in response to receiving the authentication request, an out-of-band push authentication prompt to the registered mobile device of the user through a different channel than a channel through which the authentication request was received;
    a comparison module, stored in memory, that compares a geolocation indicated by the authentication request with a geolocation indicated by the registered mobile device in response to the out-of-band push authentication prompt by comparing a measure of proximity with a proximity threshold that distinguishes between matching and nonmatching geolocations;
    a performance module, stored in memory, that performs a remedial action in response to detecting a man-in-the-middle attack based on a determination that the geolocation indicated by the authentication request and the geolocation indicated by the registered mobile device do not match; and
    at least one physical processor configured to execute the registration module, the reception module, the transmission module, the comparison module, and the performance module.

12. The system of claim 11, wherein the registration module registers the mobile device by:
    installing a mobile security application on the mobile device; and
    signing a message from the mobile device to a registration server using a private key embedded within the mobile security application.

13. The system of claim 11, wherein the transmission module transmits, in response to receiving the authentication request, the out-of-band push authentication prompt to the registered mobile device by transmitting a request for the user to approve of the authentication request.

14. The system of claim 11, wherein the transmission module transmits, in response to receiving the authentication request, the out-of-band push authentication prompt to the registered mobile device by transmitting a verification code for the user to enter through the channel through which the authentication request was received.

15. The system of claim 11, wherein the geolocation indicated by the authentication request is ascertained through a service that provides access to a database that maps Internet protocol addresses to geolocation information.

16. The system of claim 15, wherein the service provides a record that specifies at least one of:
    an address;
    longitude and latitude coordinates; and
    an organization.

17. The system of claim 11, wherein the geolocation indicated by the registered mobile device is ascertained through at least one of:
    accessing an application programming interface of the registered mobile device that provides the geolocation through a global positioning system; and
    accessing a cell id associated with the registered mobile device.

18. The system of claim 11, wherein the performance module detects the man-in-the-middle attack at least in part by:
    identifying information indicating a potential false positive in detecting the man-in-the-middle attack; and
    determining that the man-in-the-middle attack is detected despite the indication of the potential false positive.

19. The system of claim 18, wherein the performance module determines that the man-in-the-middle attack is detected despite the indication of the potential false positive by identifying a lack of confirmation information that would confirm the potential false positive, the confirmation information comprising at least one of:
    satisfaction of a challenge prompt at the registered mobile device in response to identifying the information indicating a potential false positive;
    user history information confirming that the user is trusted;

information about other users that share attributes with the user;

information indicating that an Internet protocol address does not hop; and information confirming that the user requests to access the secure computing resource through at least one of a proxy and a network address translation mechanism.

20. A non-transitory computer-readable medium comprising one or more computer-readable instructions that, when executed by at least one processor of a computing device, cause the computing device to:

register a mobile device of a user within a computing environment as an authenticated mobile device that corresponds to the user;

receive an authentication request to log into a secure computing resource as the user;

transmit, in response to receiving the authentication request, an out-of-band push authentication prompt to the registered mobile device of the user through a different channel than a channel through which the authentication request was received;

compare a geolocation indicated by the authentication request with a geolocation indicated by the registered mobile device in response to the out-of-band push authentication prompt by comparing a measure of proximity with a proximity threshold that distinguishes between matching and nonmatching geolocations; and perform a remedial action in response to detecting a man-in-the-middle attack based on a determination that the geolocation indicated by the authentication request and the geolocation indicated by the registered mobile device do not match.

\* \* \* \* \*